(12) United States Patent
Bos (10) Patent No.: US 9,436,348 B2
(45) Date of Patent: Sep. 6, 2016

(54) METHOD AND SYSTEM FOR CONTROLLING MOVEMENT OF CURSOR IN AN ELECTRONIC DEVICE

(71) Applicant: BlackBerry Limited, Waterloo (CA)

(72) Inventor: Jeffrey Charles Bos, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 354 days.

(21) Appl. No.: 14/217,845

(22) Filed: Mar. 18, 2014

(65) Prior Publication Data

US 2015/0268813 A1    Sep. 24, 2015

(51) Int. Cl.
| | |
|---|---|
| *G06F 3/048* | (2013.01) |
| *G06F 3/0481* | (2013.01) |
| *G06F 3/0488* | (2013.01) |
| *G06F 3/0484* | (2013.01) |
| *G06F 3/0482* | (2013.01) |
| *G06F 3/023* | (2006.01) |
| *G06F 3/0489* | (2013.01) |

(52) U.S. Cl.
CPC ......... *G06F 3/04812* (2013.01); *G06F 3/0235* (2013.01); *G06F 3/0482* (2013.01); *G06F 3/04842* (2013.01); *G06F 3/04886* (2013.01); *G06F 3/04892* (2013.01)

(58) Field of Classification Search
CPC .......... G06F 3/04812; G06F 3/04886; G06F 3/04842; G06F 3/0482
USPC .......... 715/773, 856, 864; 345/160; 400/486
See application file for complete search history.

(56) References Cited

U.S. PATENT DOCUMENTS

| | | | | |
|---|---|---|---|---|
| 5,620,267 | A | * | 4/1997 | Klauber ................ G06F 3/0219 400/486 |
| 2007/0015534 | A1 | | 1/2007 | Shimizu |
| 2008/0316183 | A1 | | 12/2008 | Westerman et al. |

(Continued)

FOREIGN PATENT DOCUMENTS

WO    2013/141464    9/2013

OTHER PUBLICATIONS

Wikipedia' [online], "Arrow Keys," originally updated Mar. 11, 2005, last updated Oct. 5, 2015, [retrieved on Oct. 6, 2015], Retrieved from the Internet: URL<https://en.wikipedia.org/wiki/Arrow_keys>, 6 pages.

(Continued)

*Primary Examiner* — Haoshian Shih
(74) *Attorney, Agent, or Firm* — Fish & Richardson P.C.

(57) ABSTRACT

A portable electronic device is provided. The portable electronic device includes a memory storing instructions. The portable electronic device also includes a processor executing the instructions to perform a plurality of operations. The operations may include detecting that a first key of the portable electronic device is being touched and held. The operations may also include detecting a key tapping action associated with a second key of the portable electronic device while the first key of the portable electronic device is being touched and held. The first and second keys of the portable electronic device may be located at a first and a second location of the portable electronic device respectively. The operations may further include determining a cursor direction based on the first location and the second location, and moving a position of a cursor in the cursor direction for one or more spaces.

18 Claims, 5 Drawing Sheets

(56) References Cited

U.S. PATENT DOCUMENTS

2011/0231789 A1   9/2011   Bukarak et al.
2013/0212515 A1   8/2013   Eleftheriou
2013/0321276 A1   12/2013  Zhang
2014/0145945 A1*  5/2014   Shin ..................... G06F 3/041
                                                            345/157

OTHER PUBLICATIONS

Wikipedia' [online], "Keyboard technology," originally updated Sep. 13, 2001, last updated Oct. 5, 2015, [retrieved on Oct. 6, 2015], Retrieved from the Internet: URL<https://en.wikipedia.org/wiki/Keyboard_technology>, 6 pages.

Extended European Search Report in European Application No. 15159709, dated Aug. 31, 2015, 11 pages.

* cited by examiner

METHOD AND SYSTEM FOR CONTROLLING MOVEMENT OF CURSOR IN AN ELECTRONIC DEVICE

FIELD OF TECHNOLOGY

The present disclosure relates to electronic devices including, but not limited to, portable electronic devices and their controls.

BACKGROUND

Portable electronic devices have gained widespread use. Portable electronic devices include several types of devices such as cellular telephones (mobile phones), smart telephones (smart phones), Personal Digital Assistants (PDAs), tablet computers, or laptop computers, with wireless network communications connectivity, or near-field communications connectivity, such as Bluetooth® capabilities or other electro-magnetic field communication capabilities.

When editing a text of a portable electronic device, a user may perform operations to move, correct, delete, etc. with respect to the text by manipulating a cursor through a key input or a touch input. However, users of portable electronic devices often have difficulties trying to move the cursor one space forward or backward due to the relatively small size of the display screen of the device, especially when users are on the move. Improvements in controlling movement of the cursors of an electronic device that allow the user to move the cursor one space either forward or backward are desired.

BRIEF DESCRIPTION OF THE DRAWINGS

Embodiments of the present disclosure will now be described, by way of example only, with reference to the attached Figures, wherein.

DETAILED DESCRIPTION

Reference will now be made in detail to the disclosed example embodiments, which are illustrated in the accompanying drawings. Wherever possible, the same reference numbers will be used throughout the drawings to refer to the same or like parts.

Portable electronic devices often provide multiple applications ("apps"), each app enabling the device to provide specific services and functions. For example, email or messaging apps, when executed on a device, enable the device users to input and edit text for communication with others. For another example, some apps enable device users to input user information, such as user ID and password, to be able to access the device or select apps. Embodiments consistent with the present disclosure seek to improve user experience by allowing the user to move the cursor precisely one space forward or backward with certain specific key gestures. For example, the device may detect that a certain key is being touched and held, for example, the "M" key of a keyboard, and another key which is located to the right of the "M" key is being tapped simultaneously, and in response, the device may cause the cursor to move one space to the right direction. For another example, the device may detect that a key is being touched and held, for example, the "M" key of a keyboard, and another key which is located to the left side of the "M" key is being tapped simultaneously, and in response, the device may cause the cursor to move one space, and only one space, to the left direction for each tap of the key located to the left of the "M" key. In a further example, the device may detect that a certain key is being touched and held, for example, the "M" key, and another key which is located to the left side of the "M" key is double tapped simultaneously, and in response, the device may cause the cursor to move two spaces to the left direction. In an alternative implementation, the device may detect that a certain key is being touched and held, for example the "M" key, and another key which is located to the left side of the "M" key is double tapped simultaneously, and in response, the device may cause the cursor to move one space to the left.

As used herein, a press or pressing action refers to when the device detects the user's finger pressing a key with a force that is greater than a preset threshold force. For example, when a physical keyboard is used, a pressing action may refer to a depression of one of the plurality of keys to an extent that is sufficient to engage the physical or electronic dome switch associated with that key. For another example, when a virtual keyboard is used, a pressing action may refer to an event when the sensor associated with the touchscreen senses a pressure greater than a predetermined threshold. A tap or tapping action refers to when the device detects the user's finger contacting (i.e., tap, or touch) a key but does not apply a sufficient force to constitute pressing the key. In other words, the device detects the force exerted by a tap is less than a preset threshold force that is required to constitute a press. A double tap refers to when the device detects the user tapping the same key twice within a predetermined period of time. A press and hold action refers to when the device detects the user's finger pressing the key with a force that is greater than the preset threshold force for a time period that is greater than a predetermined time period. A swiping action refers to when the device detects while the user's finger touches or hovers above and/or around a key, the user's finger also slide in a predetermined direction while the touching or hovering gesture is maintained. For example, the predetermined direction may be any direction away from the key, or around the key. A capacitive touch action refers to when the device detects the user's finger touching, including tapping, swiping, pressing, or the like, the key for a predetermined period of time. A capacitive touch and hold action refers to when the device detects the user's finger touching the key for a time period that is greater than a predetermined time period. The present disclosure generally relates to an electronic device, such as a portable electronic device. Examples of portable electronic devices include wireless communication devices such as cellular telephones (mobile phones), smart telephones (smart phones), pagers, PDAs, tablet computers, laptop computers, notebook computers, netbook computers, and so forth, with wireless communications capabilities, such as wireless cellular communications capabilities. The portable electronic device may also be a portable electronic device without wireless communications capabilities. Examples include handheld electronic game devices, digital photograph albums, digital cameras, gaming consoles, GPS devices, portable fitness devices, or similar devices.

Portable electronic devices often include various types of sensors, such as, for example, force sensors, GPS sensors, acceleration sensors, touch-sensitive sensors, and radio-frequency sensors, etc. Touch-sensitive sensors may include capacitive touch sensors, which may be associated with various components of the portable electronic devices, such as, for example, screen display, keyboard, microphone, speakerphone, buttons, etc. For example, a capacitive touch sensor may be disposed under a key or a button, which may be physical or virtual. The capacitive touch sensors may detect the presence of a key touching and holding action performed by a user when a key or button is being touched and held. The capacitive touch sensors may also detect the presence of a key tapping action performed by a user when a key or button is being touched. The capacitive touch sensors may also be calibrated with different sensitivities to generate different signals representing and distinguishing different gestures (e.g., hovering, touching, pressing, or swiping gestures).

Although this specification refers to keys (which may be physical or virtual) of a keyboard (which may be physical or virtual) as examples, it is understood that the key touch and hold, tapping action or other actions or gestures may also be associated with other components, such as a button (physical or virtual) provided on the portable electronic device. Capacitive touch sensors may be associated with the button, and may be used to detect the key touching action or other gestures associated with the button. Embodiments consistent with the present disclosure seek to move the cursor of the display screen in accordance with detected key touching or tapping actions associated with keys or buttons of the portable electronic device.

In addition, capacitive touch sensors may be associated with a surface area on the housing of the portable electronic device. A user's finger or other objects may hover above and/or around, touch, press, or swipe around a surface area, and the capacitive touch sensors may be used to detect the different gestures and determine whether the different gestures are performed by a user's finger or other objects. The above and below discussions relating to keys or buttons may also be applied to the surface areas. Moreover, in the above discussions and below discussions, when a user's finger is referred to, it is understood that the user's finger may be a bare finger, or may be covered by a glove, a piece of cloth, rubber, or other material or device that is suitable for operating various components of the portable electronic device. In the above and below discussions, the user's finger may also be functionally replaced by other devices, such as a stylus or electronic pen.

Figure 1:
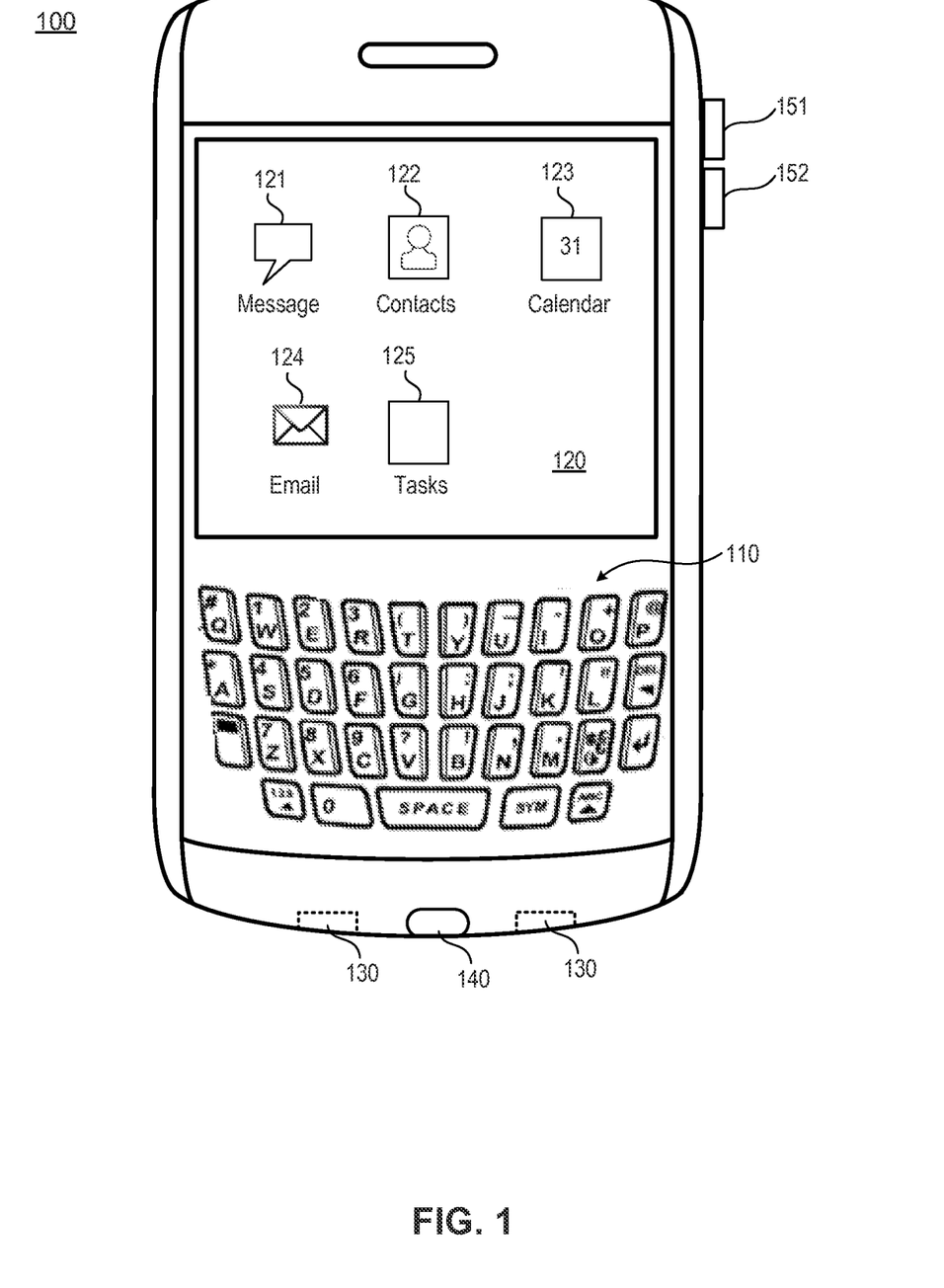
FIG. 1 shows an example of a portable electronic device, in accordance with the present disclosure.

FIG. 1 shows an example of a portable electronic device 100 in which system and methods may be implemented consistent with the present disclosure. The portable electronic device 100 may include a keyboard 110. The keyboard 110 may be any suitable layout, such as QWERTY, QWERTZ, AZERTY, Dvorak, or the like. The keyboard 110 may be a reduced keyboard which, for example, has two or more characters associated with certain keys, such as a reduced QWERTY keyboard layout. For example, a reduced QWERTY keyboard may be provided in which the letters Q and W share a single key, the letters E and R share a single key, and so forth. The keyboard 110 may be a physical keyboard, in which each individual key is a physical key. The keyboard 110 may also be a virtual keyboard displayed on display screen 120, in which each individual key is a virtual key. The display screen 120 may be any suitable type of display screen. In one embodiment, the display screen 120 may include a touch-sensitive display.

The display screen 120 displays a graphical user interface with various icons (or logos, pictures) corresponding to various apps installed in the portable electronic device 100. For example, the portable electronic device 100 may include a message app 121, a contacts app 122, a calendar app 123, an email app 124, and a tasks app 125. The display screen 120 may display icons representing these apps and other functions provided by the portable electronic device 100. For example, although not shown, the display screen 120 may display icons representing a map app, a Web browser app, a word processing app, a game app, and so forth. When an app is selected and launched, the display screen 120 displays content and/or interfaces associated with the app. For example, when a message app is selected and launched, the display screen 120 displays a text entry area for the user to input text, and in the text entry area, a flashing cursor may be displayed to indicate where text will be placed when entered (the insertion point). A cursor is also sometimes referred as a pointer.

The portable electronic device 100 may include other physical components, such as a first volume adjusting button 151, a second volume adjusting button 152, a speaker 130, and a microphone 140. It is understood the portable electronic device 100 may include additional components not shown in FIG. 1, and may not include all of the exemplary components shown in FIG. 1.

Figure 2:
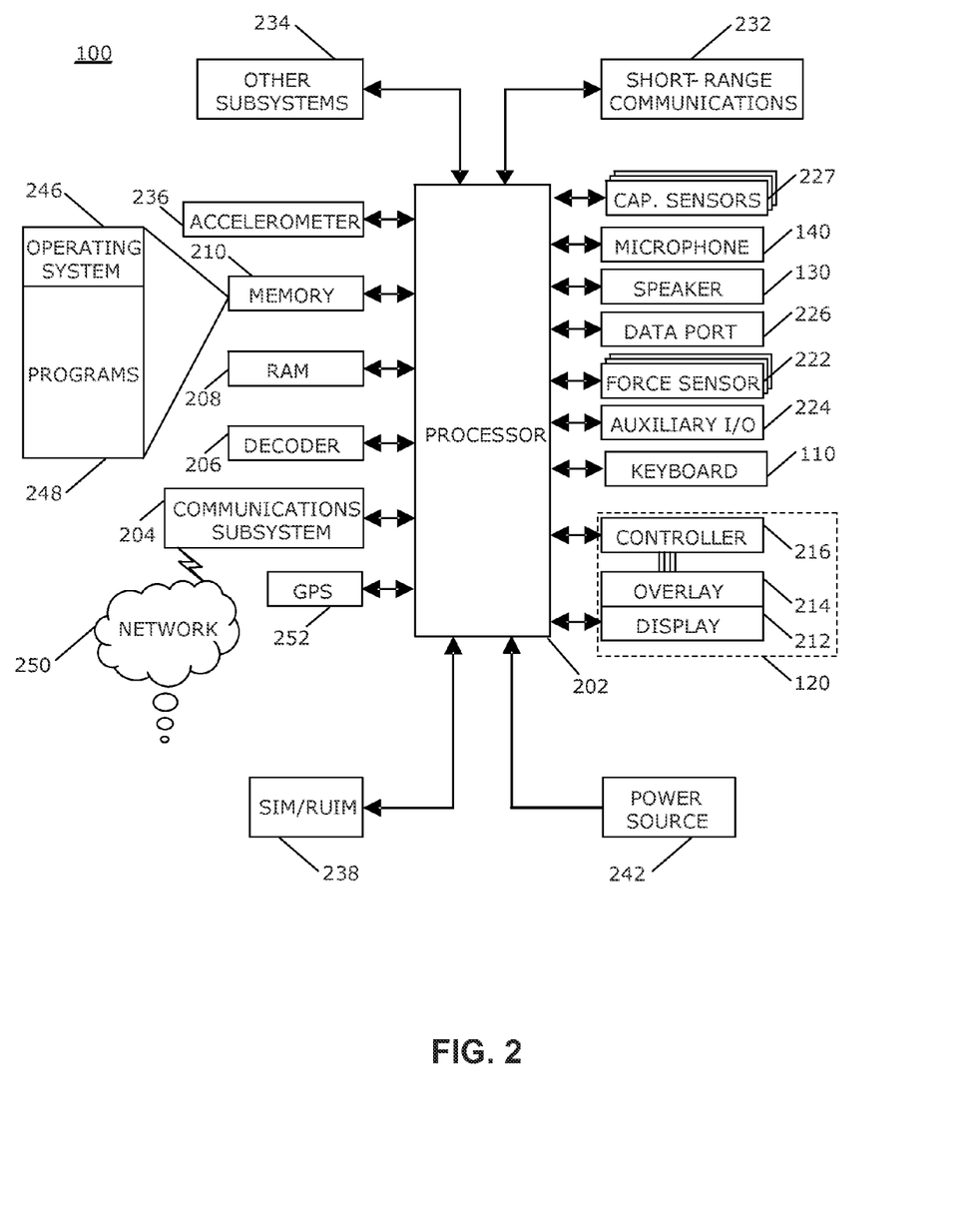
FIG. 2 shows a block diagram of the portable electronic device shown in FIG. 1, in accordance with the present disclosure.

FIG. 2 shows a block diagram of the portable electronic device 100 shown in FIG. 1, consistent with the present disclosure. The block diagram 100 shows software and hardware components included in the portable electronic device 100. It is understood the portable electronic device 100 may include additional components not shown in FIG. 2, and may not include all of the example components shown in FIG. 2. The portable electronic device 100 includes a processor 202, that controls operations of portable electronic device 100. The portable electronic device 100 may include a communications subsystem 204 and a short-range communications 232 module to perform various communication functions, including data and voice communications. Data received by the portable electronic device 100 may be decompressed and decrypted by a decoder 206. The communications subsystem 204 may receive messages from and may send messages to a network 250. The portable electronic device 100 may include a power source 242, such as one or more rechargeable batteries or a port to an external power supply, which may supply power to various components of the portable electronic device 100. The network 250 may be any type of network, including, but not limited to, data wireless networks, voice wireless networks, and networks that support both voice and data communications. The network 250 may be wired or wireless.

The processor 202 is coupled to and interacts with a Random Access Memory (RAM) 208, a memory 210, or the display screen 120. The RAM 208 and the memory 210 may be any suitable type of memory, for example, a non-transitory flash memory. RAM 208 and memory 210 may store computer instructions or codes that may be executable by the processor 202 to perform various functions, methods, processes, or operations discussed in the present disclosure.

The display screen 120 may include a display 212, which may be a touch-sensitive display. In the example embodiment of FIG. 2, the display 212 is coupled to a touch-sensitive overlay 214 and an electronic controller 216. The processor 202 may also be coupled to one or more force sensors 222, a Global Positioning System sensor or antenna (GPS) 252, an auxiliary input/output (I/O) subsystem 224, a data port 226, the speaker 130, the microphone 140, the keyboard 110, and other device subsystems 234.

User-interaction with a graphical user interface (GUI) may be performed through the touch-sensitive overlay 214. The processor 202 may interact with the touch-sensitive overlay 214 via the electronic controller 216. Information, such as text, characters, symbols, images, icons, and other items that may be displayed or rendered on the display screen 120 via the processor 202. The processor 202 may interact with an accelerometer 236 to detect an acceleration caused by, for example, a shake or other force applied to the portable electronic device 100. The processor 202 may interact with the GPS 252 in order to determine the geographical location or moving speed of the portable electronic device 100.

To identify a subscriber for network access, the portable electronic device 100 may use a Subscriber Identity Module or a Removable User Identity Module (SIM/RUIM) card 238 for communication with a network, such as the network 250, which may be wireless. Alternatively or additionally, user identification information may be programmed into memory 210 or RAM 208.

The portable electronic device 100 includes an operating system 246 and software programs 248 that may be executed by the processor 202. The operating system 246 and software programs or components 248 contain computer codes or instructions that may be executed by the processor 202, and may be stored in a persistent, updatable storage device, such as the memory 210. Additional applications or programs may be loaded onto the portable electronic device 100 through the network 250, the auxiliary I/O subsystem 224, the data port 226, the short-range communications subsystem 232, or any other suitable subsystem 234. The software programs or components 248 may include instructions executable by the processor 202 for performing various processes or methods disclosed in the present disclosure.

A received signal, such as a text message, an email message, or web page download, may be processed by the communications subsystem 204 and input to the processor 202. The processor 202 processes the received signal for output to the display 212 and/or to the auxiliary I/O subsystem 224. A subscriber may generate data items, for example email messages, which may be transmitted over the network 250 through the communications subsystem 204, for example.

The portable electronic device 100 may further include a plurality of capacitive touch sensors (or capacitive sensors) 227. The capacitive touch sensors 227 may be associated with various other components of the portable electronic device 100, such as keys on the keyboard 110, the microphone 140, the speaker 130, the data port 226, the volume adjusting buttons 151 and 152, other buttons or surface areas provided on the portable electronic device 100. When the user's finger, a stylus or electronic pen hovers above/around a key or any other component, touches the key or any other component, presses the key or any other component, or swipes around the key or any other component, the capacitive touch sensors 227 associated with the key or the any other component generates signals corresponding to the different gestures of hovering, touching, pressing, or swiping. The processor 202 may determine the type of gesture based on the signals received from the capacitive touch sensors. For example, in one embodiment, the portable electronic device 100 may include a plurality of capacitive touch sensors 227 disposed under each physical key of the physical keyboard 110. When a user's finger hovers above and/or around a key, touches a key, presses a key, or swipes around a key, the capacitive touch sensor associated with the key generates a corresponding signal, and the signal is processed by the processor 202 to determine the type of gesture (e.g., hovering, touching, pressing, or swiping).

The portable electronic device 100 is configured to enter a fine cursor control mode that allows a user to control the movement of the cursor by certain gesture, for example, touching a key or other components of the portable electronic device 100. In some embodiments, in the fine cursor control mode, a user may navigate the position of the cursor by touching and holding a key on the keyboard, and simultaneously tapping another key on the keyboard. This gesture of touching and holding a first key and simultaneously tapping a second key is referred to as a trill gesture. For example, the capacitive touch sensors 227 detects the trill gesture and the location of the first key being touched and held, as well as the location of the second key being tapped. The processor 202 determines the relative direction of the location of the second key with reference to the location of the first key, for example, a right direction or a left direction. In some embodiments, the processor 202 causes the cursor to step (i.e., move one space) in the direction of the location of the second key with reference to the location of the first key. In other embodiments, the processor 202 may cause the cursor to step in the opposite direction of the location of the second key with reference to the location of the first key.

The fine cursor control mode may be turned on or off (i.e., switched) through a switching component, such as a key, a button, or a surface area provided on the portable electronic device 100. For example, the key for letter "F" on the keyboard 110 may be the switching component. The fine cursor control mode may be turned on by the user by pressing and holding the key "F" for a predetermined time period (e.g., one second). The fine cursor control mode may also be turned on by the user pressing a combination of keys, for example, "SPACE" and "F," simultaneously or sequentially, and/or for a predetermined time period (e.g., 0.5 second). The fine cursor control mode may also be turned on by pressing one or both of the first and second volume adjusting buttons 151 and 152, for example, when the portable electronic device 100 is in a locked state.

Figure 3:
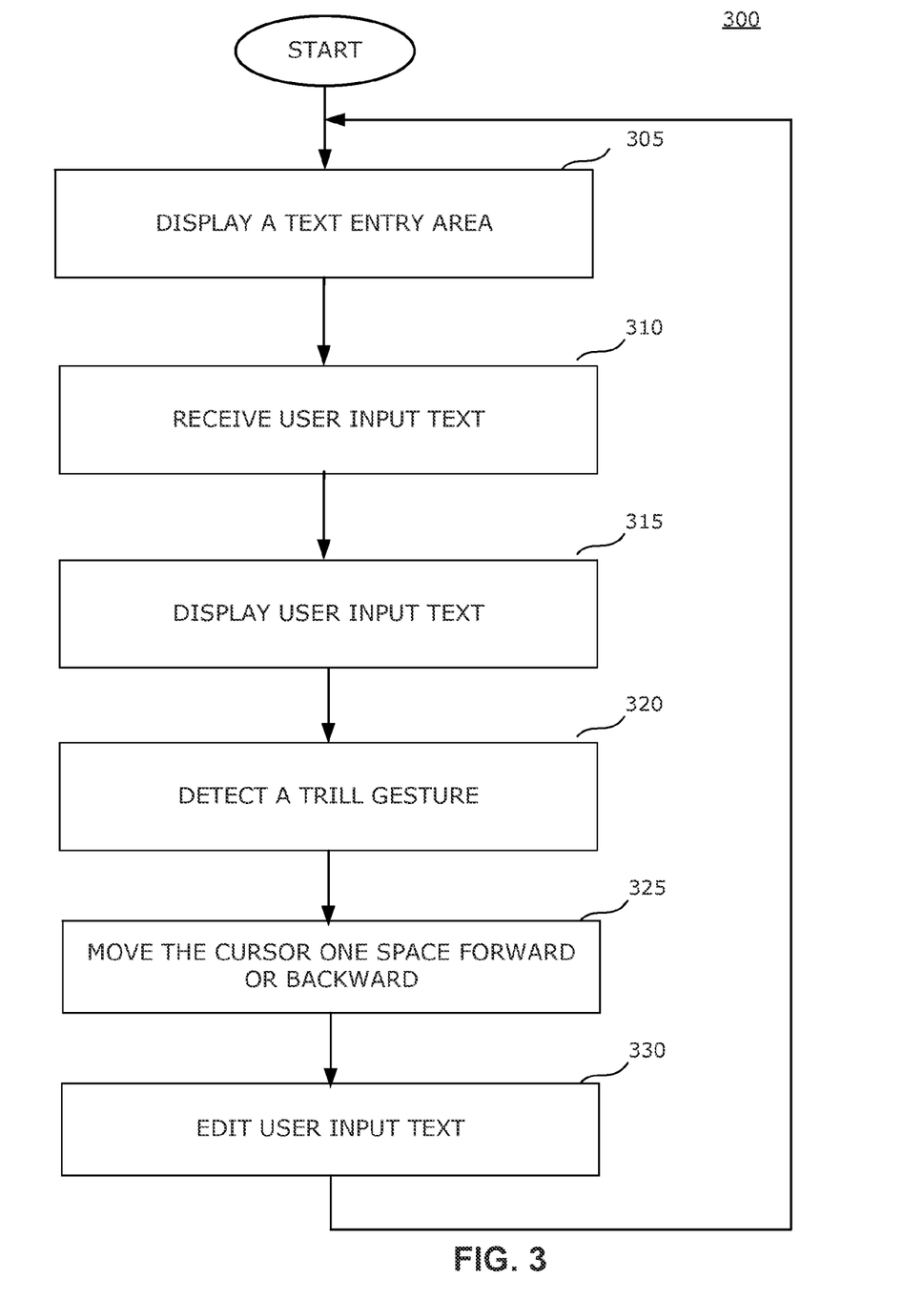
FIG. 3 shows an example process for text edit and entry processing by the portable electronic device, in accordance with the present disclosure.

FIG. 3 is a flowchart showing an example process 300 for text edit and entry processing by the portable electronic device 100. Process 300 starts with displaying a text entry area on the display 120 (Step 305). As the user enters text (or characters) by selecting keys on a keyboard associated with the portable electronic device 100, the user input text is received by the portable electronic device 100 (Step 310). The user input text is also displayed on the display of the portable electronic device 100 (Step 315).

At Step 320, the portable electronic device 100 detects a trill gesture performed by the user. For example, the portable electronic device 100 may detect that the key "H" of the portable electronic device 100 is being touched and held while the key "J" of the portable electronic device 100 is being tapped.

Although trill gesture in one instance involves keys on the keyboard 110 (e.g., key "P" on the keyboard 110 or any other key on the keyboard 110 may be used), in other instances, the trill gesture may involve any other suitable physical component provided on the portable electronic device 100. For example, in some embodiments, one or both of the first and second volume adjusting buttons 151 and 152 may be used as part of the trill gesture for moving the cursor of the portable electronic device 100. In some embodiments, the "MENU" key, the "Enter" key, or the keys used to accept or reject phone calls may also be used as part of the trill gesture. In some embodiments, a trill gesture performed on any key on the keyboard 110 may trigger the cursor movement on the portable electronic device 100. In other embodiments, a trill gesture performed on certain specified keys on the keyboard 110 may trigger the cursor movement on the portable electronic device 100, while a trill gesture performed on other keys on the keyboard 110 may not trigger the cursor movement on the portable electronic device 100.

In some embodiments, a key press action may be detected when one or more of the force sensors 222 sense that the key is pressed with a force that is greater than a preset threshold force. In some embodiments, a key press action may be detected when a depression of one of the plurality of keys to an extent that is sufficient to engage the physical or electronic dome switch associated with the key. In contrast, a key press and hold action may be detected when one of more of the force sensors 222 sense that the key is pressed with a force that is greater than a preset threshold force for a time period greater than a preset threshold time. A key touching action may be detected when one or more of the capacitive sensors 227 sense that the key is touched for a predetermined time period. A key touch and hold action may be detected when one or more of the capacitive sensors 227 sense that the key is touched for a time period that is greater than a predetermined time period. A key tapping action may be detected when one or more of the capacitive sensors 227 sense that the key is touched for a time period less than or equal to a predetermined threshold time, such as 0.5 seconds. When the keyboard is a physical keyboard, a tap on a key does not engage the physical or electronic dome switch associated with that key. In some embodiments, keyboard 110 may be a virtual keyboard implemented with touchscreen, which, like a capacitive physical keyboard, is programmable to distinguish between different types of key actions like the key touch and tap actions described above. For example, the virtual keyboard may distinguish these types of key actions based on pressure sensed on touchscreen 120, or by measuring the duration of a touch event. The processor 202 may detect a trill gesture based on the combination of key actions detected by the capacitive touch sensor or touchscreen.

At Step 325, the portable electronic device 100 may move the position of the cursor one space forward or backward, depending on the relative location of the second key with reference to the first key. For example, if the second key is located at the right side of the first key, the position of the cursor may be moved in the forward direction. For another example, if the second key is located at the left side of the first key, the position of the cursor may be moved in the backward direction. In some embodiments, if the second key is being tapped for multiple times while the first key is being touched and held, the position of the cursor may be moved forward or backward for multiple spaces.

At step 330, after the cursor is moved to the desired position, a user is able to edit the input text. After the user input text has been edited as desired by the user, the text entry and edit processing 300 returns to repeat the operation 305 and subsequent operations so that the newly edited user input text can be displayed on the display of the portable electronic device 100 and further editing thereafter permitted. The text entry and edit processing 300 may end when the user has completed the input text and does not desire to edit the text.

Figure 4:
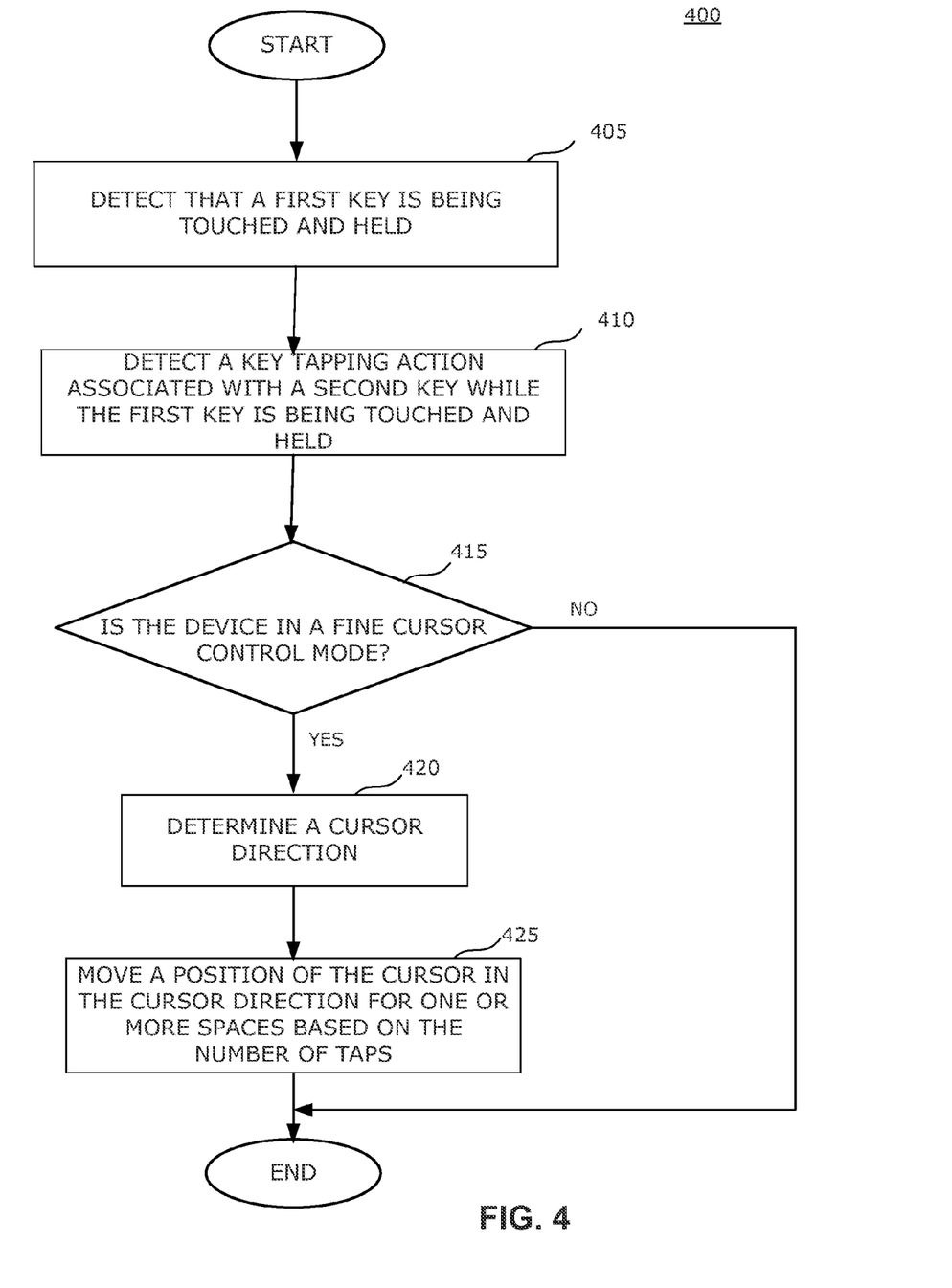
FIG. 4 shows an example process for controlling movement of a cursor of the portable electronic device, in accordance with the present disclosure.

FIG. 4 shows an example process 400 for controlling movement of a cursor of the portable electronic device, consistent with the present disclosure. In this embodiment, a cursor may be moved one space forward or backward in response to a combination of key actions.

As shown in FIG. 4, process 400 starts with detecting that a first key of the portable electronic device 100 is being touched and held (Step 405). In some embodiments, the first key of the portable electronic device 100 may be any key on the keyboard 110. The first key of the portable electronic device 100 may be any other suitable physical component provided on the portable electronic device 100.

The processor 202 detects a key tapping action associated with a second key of the portable electronic device while the first key is being touched and held (Step 410). In some embodiments, the second key of the portable electronic device 100 may be any key on the keyboard 110. The second key of the portable electronic device 100 may be any other suitable physical component provided on the portable electronic device 100. In some embodiments, the second key may be located in the same row of the first key. For example, with reference to FIG. 1, if the key "R" is the first key being touched and held, the second key may be any other key on the first row of keyboard 110. In some other embodiments, the second key may be located in the same row or in a different row from the first key. For example, with reference to FIG. 1, if the key "R" is the first key being touched and held, the second key may be any other key on any row of keyboard 110.

The processor 202 determines whether the portable electronic device 100 is currently configured to be in a fine cursor control mode (Step 415). For example, the processor 202 may determine whether the device is in the fine cursor control mode by determining whether a switching component is turned on. The switching component may be a key, a button, or a surface area provided on the portable electronic device 100. In some embodiments, after detecting the combination of key actions associated with the first and second keys, the processor 202 may cause the display screen to display an interface allowing the user to select whether to enter the fine cursor control mode.

If the processor 202 determines that the portable electronic device 100 is not in the fine cursor control mode (No, Step 415), the processor 202 may not cause any movement of the cursor in response to the detection of the combination of key actions associated with the first and second keys. In some embodiments, if the processor 202 determines that the portable electronic device 100 is not in the fine cursor control mode (No, Step 415), the processor 202 may cause the display screen to display an interface inquiring whether the user wishes to switch the device to the fine cursor control mode, such that the user may subsequently turn on the fine cursor control mode by providing appropriate input.

If the processor 202 determines that the portable electronic device 100 is in the fine cursor control mode (Yes, Step 415), the processor proceeds to determine a cursor direction for moving the cursor (Step 420). The cursor direction may be determined based on the location of the first and second keys. For example, if the second key that is being tapped is located to the right side of the first key that is being touched and held, the processor 202 may determine the cursor direction is a forward direction. For another example, if the second key that is being tapped is located to the left side of the first key that is being touched and held, the processor 202 may determine the cursor direction is a backward direction. In some embodiments, the cursor direction may also be an upward or downward direction. For example, if the second key that is being tapped is located below the first key that is being touched and held, the processor 202 may determine the cursor direction is a downward direction. For another example, if the second key that is being tapped is above the first key that is being touched and held, the processor 202 may determine the cursor direction is an upward direction. In some embodiments, the cursor direction may be a diagonal direction. For example, if the second key that is being tapped is located lower and to the right of the first key that is being touched and held, the processor 202 may determine the cursor direction is a diagonal direction towards the lower-right side of the first key, and move the cursor diagonally, e.g., one space to the right and one space down. For another example, if the second key that is being tapped is located upper and to the right of the first key that is being touched and held, the processor 202 may determine the cursor direction is a diagonal direction towards the upper-right side of the first key, and move the cursor diagonally, e.g., one space to the right and one space up.

The processor 202 may cause the cursor of the portable electronic device 100 to move one or more spaces in the cursor direction (Step 425). In some embodiments, the number of spaces that the cursor moves may be associated with the detected number of key tapping actions. For example, if the second key is being tapped a single time, the cursor may move one space in the cursor direction. If the second key is being tapped twice while the first key is being touched and held, the cursor may move two spaces in the cursor direction. In some embodiments, the number of spaces that the cursor moves may be preconfigured regardless of the detected number of key tapping actions. For example, the cursor may move one space in the cursor direction regardless how many times the second key is being tapped while the first key is touched and held. In this case, to continue moving the cursor one space in the cursor direction, the first key may have to be released before the combination of the key actions is performed again. In some embodiments, if the second key is held while the first key is being touched and held simultaneously, the cursor may move in the cursor direction continuously until the second key is released or until the cursor reaches an end of line (EOL). In other words, if the second key is still being held and the cursor has reached an EOL, the cursor may stop at the EOL and stop moving even though the second key is still being held. If the second key is released before the cursor reaches an EOL, the cursor may stop moving at the time the second key is released.

In some embodiments, the first key may be touched and the second key may be touched and held to cause the cursor move in the cursor direction one space or continuously. For example, if the first key is touched and the second key located to the right of the first key is touched and held, the processor 202 may determine the cursor direction is a forward direction, and cause the cursor to move one space in the cursor direction. For another example, if the first key is touched and the second key located to the right of the first key is touched and held, the processor 202 may determine the cursor direction is a forward direction, and cause the cursor to move continuously in the cursor direction until the second key is released. For yet another example, if the first key is touched and the second key located below the first key is touched and held, the processor 202 may determine the cursor direction is a downward direction, and cause the cursor to move one row below.

In some embodiments, the first key may be touched and the second key may be touched and held to cause the cursor to move to the start or end of the line or paragraph. For example, if the first key is touched and the second key located to the right of the first key is touched and held, the processor 202 may determine the cursor direction is a forward direction, and cause the cursor to move to the end of the line. For another example, if the first key is touched and the second key located to the left of the first key is touched and held, the processor 202 may determine the cursor direction is a backward direction, and cause the cursor to move to the start of the line. For yet another example, if the first key is touched and the second key located right to the first key is touched and held, the processor 202 may determine the cursor direction is a forward direction, and cause the cursor to move to the end of paragraph. For yet another example, if the first key is touched and the second key located left to the first key is touched and held, the processor 202 may determine the cursor direction is a backward direction, and cause the cursor to move to the start of paragraph. For yet another example, if the first key is touched and the second key located below the first key is touched and held, the processor 202 may determine the cursor direction is a downward direction, and cause the cursor to move to the end of paragraph. For yet another example, if the first key is touched and the second key located above the first key is touched and held, the processor 202 may determine the cursor direction is an upward direction, and cause the cursor to move to the start of paragraph.

In some embodiments, the first key may be touched and the second key may be double tapped quickly to cause the cursor to move to the start or end of the line or paragraph. For example, if the first key is touched and the second key located to the right of the first key is double tapped quickly, e.g., double tapped in a time period shorter than a predetermined threshold, the processor 202 may determine the cursor direction is a forward direction, and cause the cursor to move to the end of the line. For another example, if the first key is touched and the second key located to the left of the first key is double tapped quickly, the processor 202 may determine the cursor direction is a backward direction, and cause the cursor to move to the start of the line. For yet another example, if the first key is touched and the second key located right to the first key is double tapped quickly, the processor 202 may determine the cursor direction is a forward direction, and cause the cursor to move to the end of paragraph. For yet another example, if the first key is touched and the second key located left to the first key is double tapped quickly, the processor 202 may determine the cursor direction is a backward direction, and cause the cursor to move to the start of paragraph. For yet another example, if the first key is touched and the second key located below the first key is double tapped quickly, the processor 202 may determine the cursor direction is a downward direction, and cause the cursor to move to the end of paragraph. For yet another example, if the first key is touched and the second key located above the first key is double tapped quickly, the processor 202 may determine the cursor direction is an upward direction, and cause the cursor to move to the start of paragraph.

In some embodiments, the first key may be touched, and a second and third key may be touched and held simultaneously to cause the cursor to move to the start or end of the line or paragraph. For example, if the first key is touched, and the second and third keys which are both located to the right of the first key are touched and held, the processor 202 may determine the cursor direction is a forward direction, and cause the cursor to move to the end of the line. For another example, if the first key is touched, and the second key and third keys which are both located to the left of the first key are touched and held simultaneously, the processor 202 may determine the cursor direction is a backward direction, and cause the cursor to move to the start of the line. For yet another example, if the first key is touched, and the second key and third keys which are both located to the right of the first key are touched and held simultaneously, the processor 202 may determine the cursor direction is a forward direction, and cause the cursor to move to the end of paragraph. For yet another example, if the first key is touched, and the second key and third keys which are both located to the left of the first key are touched and held simultaneously, the processor 202 may determine the cursor direction is a backward direction, and cause the cursor to move to the start of paragraph. For yet another example, if the first key is touched, and the second key and third keys which are both located below the first key are touched and held simultaneously, the processor 202 may determine the cursor direction is a downward direction, and cause the cursor to move to the end of paragraph. For yet another example, if the first key is touched, and the second key and third keys which are both located above the first key are touched and held simultaneously, the processor 202 may determine the cursor direction is an upward direction, and cause the cursor to move to the start of paragraph.

Figure 5:
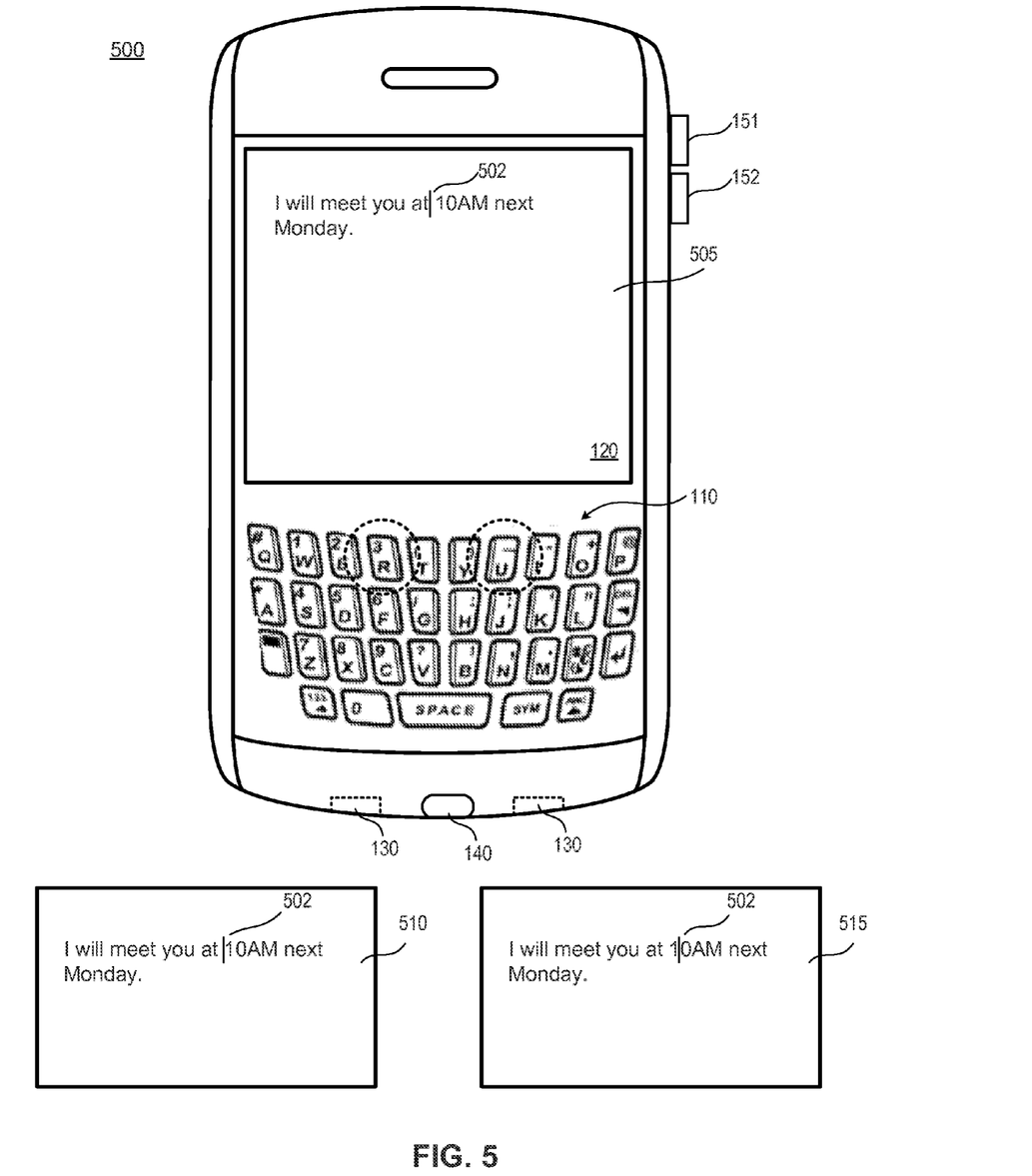
FIG. 5 shows an example of a user interface for demonstrating movement of the cursor of the portable electronic device, in accordance with the present disclosure.

FIG. 5 shows an example of a user interface 500 for demonstrating movement of the cursor of the portable electronic device consistent with the present disclosure. In this example, the device detects a user performing a trill gesture to move the cursor of the portable electronic device 100.

As shown in FIG. 5, display screen 120 displays text input that a user is editing. A cursor 502 is displayed to indicate where the text will be placed when entered. In FIG. 5, the cursor 502 is shown as a thin vertical line, although the cursor may be represented in any other shape, color, or size without departing from the scope of the present disclosure. The cursor may be flashing or steady on the display screen 120.

In this example, the user would like to move the current position of the cursor (after word "at", shown in 505) one space forward to just before the word "10AM" on the display screen. The device may detect that the fine cursor control mode is turned on by detecting pressing action of a specific key on the keyboard, such as the key "F". When the portable electronic device enters the fine cursor control mode, the user may touch and hold the key "R" and tap the key "U" simultaneously. The device may detect that a first key is touched and held and a second key is tapped simultaneously. In response, the device may cause the cursor 502 to advance one space and move to the position right before the word "10AM" (shown in 510). The user may tap the key "U" again while the key "R" is continuously being touched and held. In response, the device may cause the cursor 502 to advance another space from the position right before the word "10AM" and move to the position right after the letter "1" (shown in 515).

Similarly, if the user would like to move the position of the cursor shown in 515 backward to the position right before the word "10AM" as shown in 510, the user may touch and hold the key "U" and tap the key "R" simultaneously. In response, the cursor 502 would move backward one space and move to the position right before the word "10AM" (shown in 510). The user may tap the key "R" again while the key "U" is continuously being touched and held. In response, the cursor 502 would move backward another space from the position right before the word "10AM" and move to the position right after the word "at" (shown in 505).

Although the keys "R" and "U" are used in this example, any other keys may be used to control the movement of the cursor. For example, instead of using key "U", key "Y" may be used in place of key "U". Because key "Y" is also located to the right side of key "R", the user may touch and hold the key "R" and tap the key "Y" simultaneously to move the cursor forward one space. For another example, the user may also touch and hold the key "SPACE" and tap the key "SYM" simultaneously to move the cursor forward one space.

In some embodiments, the keys for performing the trill gesture may not be located on the same row. For example, instead of using key "U", key "J" may be used in place of key "U". Although key "J" is located in a different row from key "R", it is unambiguous that key "J" is located to the right side of key "R". Therefore, the user may touch and hold the key "R" and tap the key "J" simultaneously to move the cursor forward one space.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of transitory or non-transitory computer readable media, such as secondary storage devices, for example, hard disks, floppy disks, or CD ROM, or other forms of RAM or ROM, USB media, DVD, or other optical drive media.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:
1. A portable electronic device, comprising:
  a memory storing instructions; and
  a processor executing the instructions to perform operations comprising:
    detecting that a first key of the portable electronic device is being touched and held, the first key of the portable electronic device located at a first location of the portable electronic device;
    detecting a key tapping action associated with a second key of the portable electronic device while the first key of the portable electronic device is being touched and held, the second key of the portable electronic device located at a second location of the portable electronic device;
    determining a cursor direction based on the first location and the second location, wherein the cursor direction is a relative direction of the second location with reference to the first location; and
    moving a position of a cursor in the cursor direction for one or more spaces.
2. The portable electronic device of claim 1, wherein the operations further comprises:

detecting a trill gesture associated with the first and second keys.

3. The portable electronic device of claim 1, wherein the first and second keys each is a physical key on a physical keyboard of the portable electronic device.

4. The portable electronic device of claim 1, further comprising:
a touch screen coupled to the processor, wherein the first and second keys each is a virtual key on a virtual keyboard of the portable electronic device.

5. The portable electronic device of claim 1, wherein the first and second keys of the portable electronic device are each associated with a capacitive touch sensor.

6. The portable electronic device of claim 1, wherein the operations further comprises:
determining that the portable electronic device is configured to be in a fine cursor control (FCC) mode prior to moving the position of the cursor.

7. The portable electronic device of claim 1, wherein the operations further comprises:
detecting a plurality of the key tapping actions associated with the second key of the portable electronic device while the first key of the portable electronic device is being touched and held; and
moving the position of the cursor in the cursor direction for a plurality of spaces.

8. The portable electronic device of claim 7, wherein the plurality of the key tapping action includes a number of the key tapping actions, and the plurality of spaces includes a number of spaces identical to the number of the key tapping actions.

9. A computer-implemented method for activating a portable electronic device, the method comprising the following operations executed by a processor:
detecting that a first key of the portable electronic device is being touched and held, the first key of the portable electronic device located at a first location of the portable electronic device;
detecting a key tapping action associated with a second key of the portable electronic device while the first key of the portable electronic device is being touched and held, the second key of the portable electronic device located at a second location of the portable electronic device;
determining a cursor direction based on the first location and the second location, wherein the cursor direction is a relative direction of the second location with reference to the first location; and
moving a position of a cursor in the cursor direction for one or more spaces.

10. The method of claim 9, further comprising:
detecting a trill gesture associated with the first and second keys.

11. The method of claim 9, wherein the first and second keys each is a physical key on a physical keyboard of the portable electronic device.

12. The method of claim 9, wherein the first and second keys each is a virtual key on a virtual keyboard of the portable electronic device.

13. The method of claim 9, wherein the first and second keys of the portable electronic device are each associated with a capacitive touch sensor.

14. The method of claim 9, further comprising:
determining that the portable electronic device is configured to be in a fine cursor control (FCC) mode prior to moving the position of the cursor.

15. The method of claim 9, further comprising:
detecting a plurality of the key tapping actions associated with the second key of the portable electronic device while the first key of the portable electronic device is being touched and held; and
moving the position of the cursor in the cursor direction for a plurality of spaces.

16. The method of claim 15, wherein the plurality of the key tapping action includes a number of the key tapping actions, and the plurality of spaces includes a number of spaces identical to the number of the key tapping actions.

17. A non-transitory computer-readable medium encoded with instructions that, when executed by a processor, causes the processor to perform operations comprising:
detecting that a first key of a portable electronic device is being touched and held, the first key of the portable electronic device located at a first location of the portable electronic device;
detecting a key tapping action associated with a second key of the portable electronic device while the first key of the portable electronic device is being touched and held, the second key of the portable electronic device located at a second location of the portable electronic device;
determining a cursor direction based on the first location and the second location, wherein the cursor direction is a relative direction of the second location with reference to the first location; and
moving a position of a cursor in the cursor direction for one or more spaces.

18. The non-transitory computer-readable medium of claim 17, wherein the first and second keys each is a physical key on a physical keyboard of the portable electronic device.

* * * * *